Nov. 27, 1928.  1,693,271
A. G. DANNELL
ELECTRICAL HEATING AND FORMING MEANS
Filed May 11, 1927    3 Sheets-Sheet 1
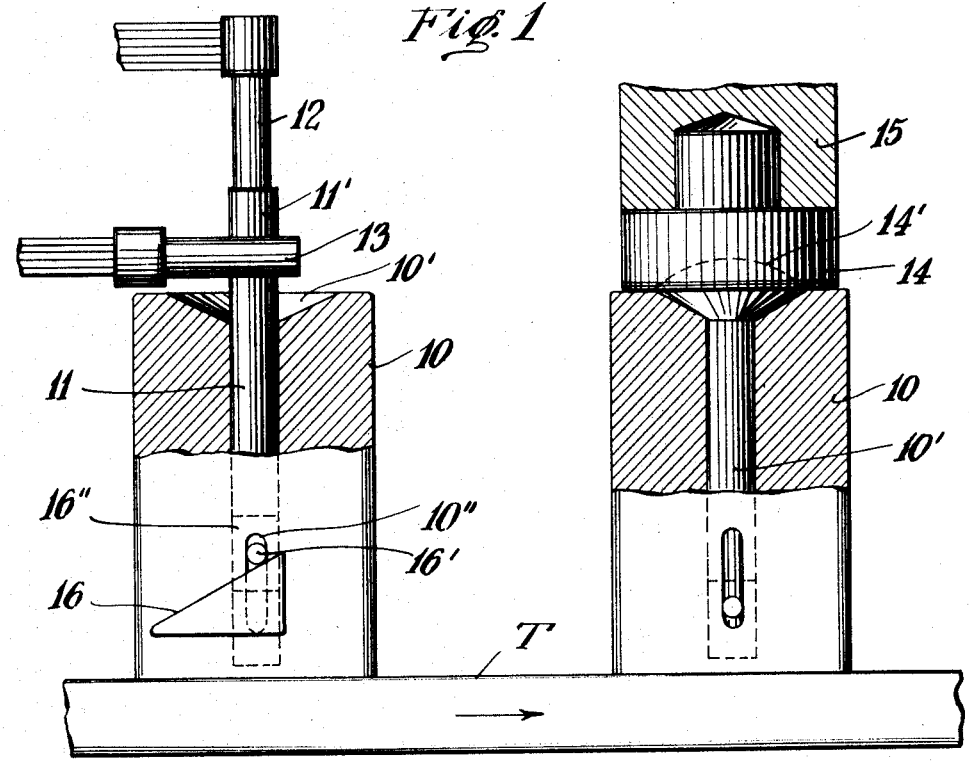
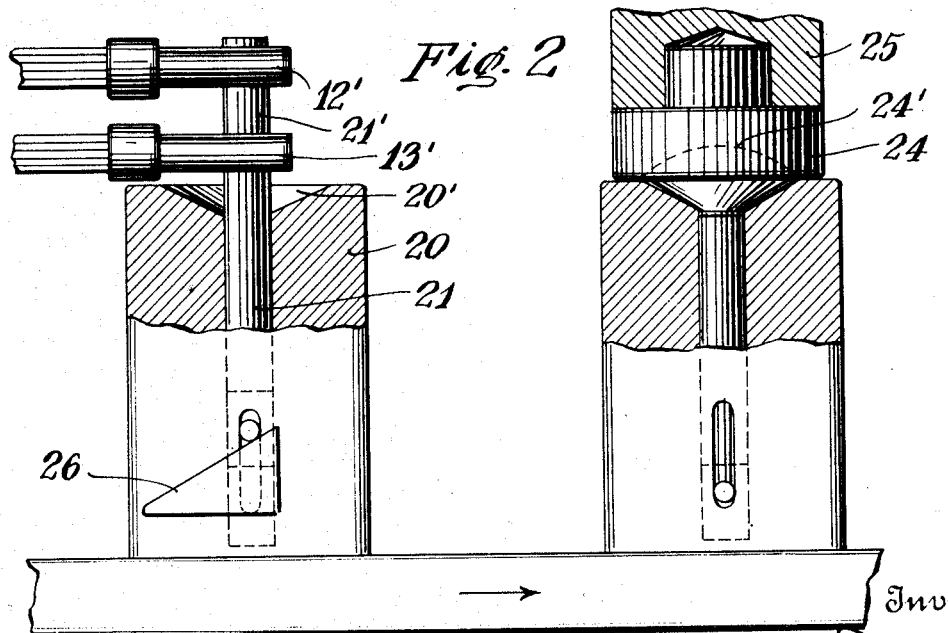
Inventor
Arthur G. Dannell

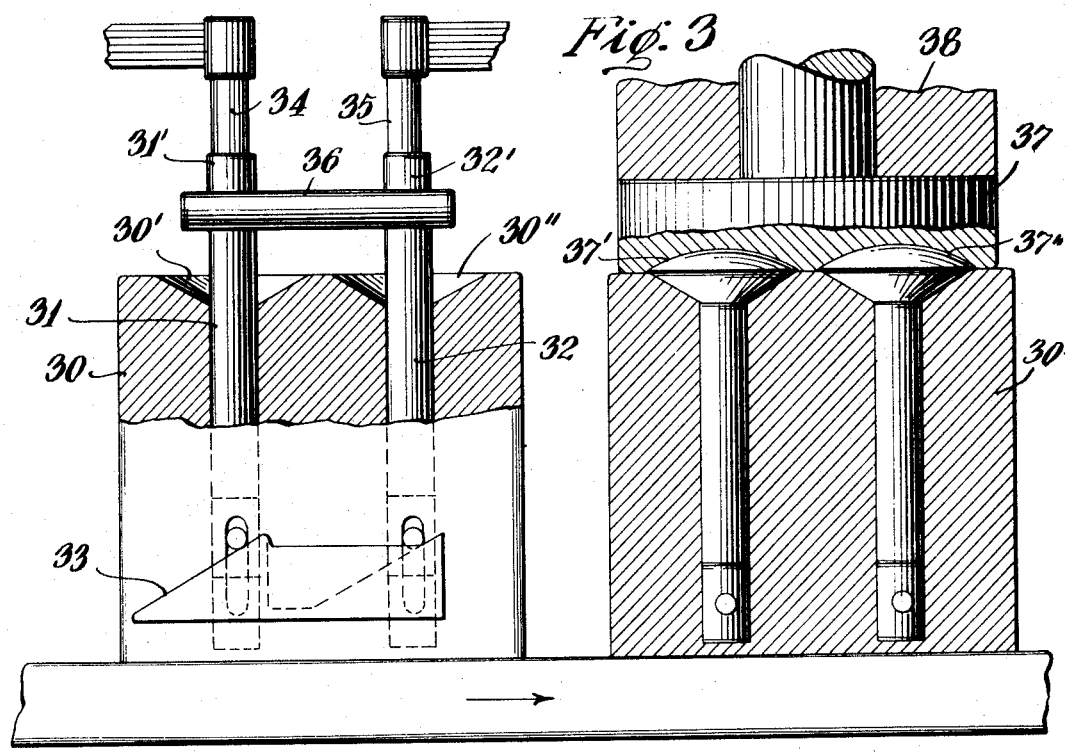
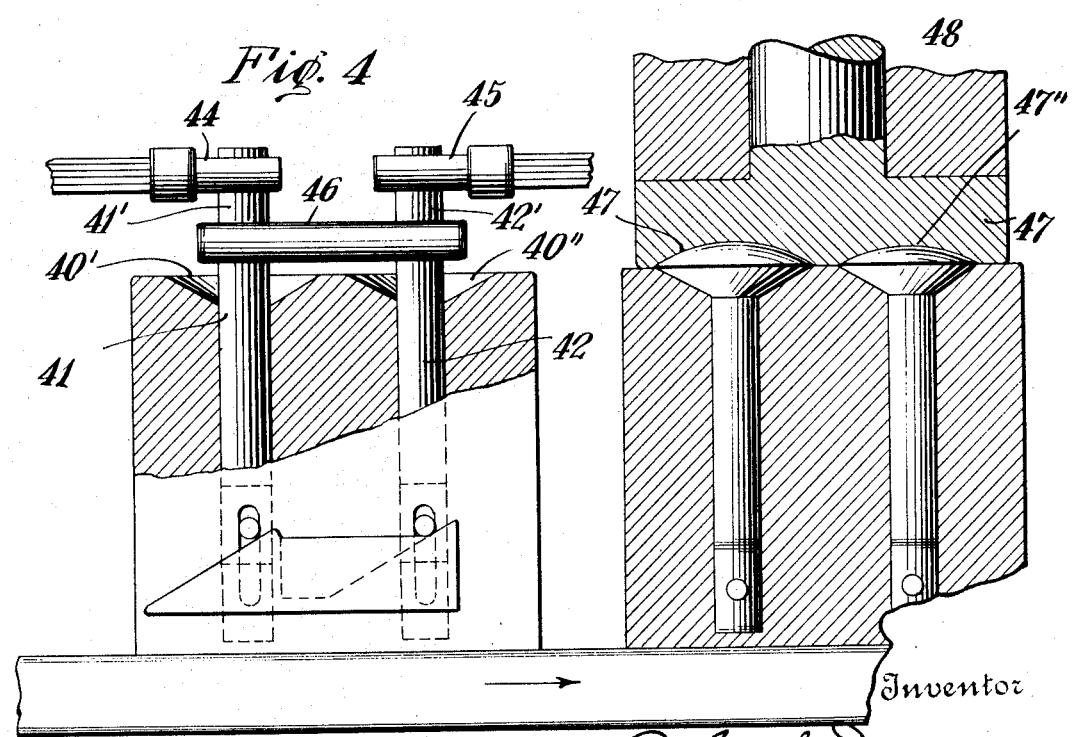

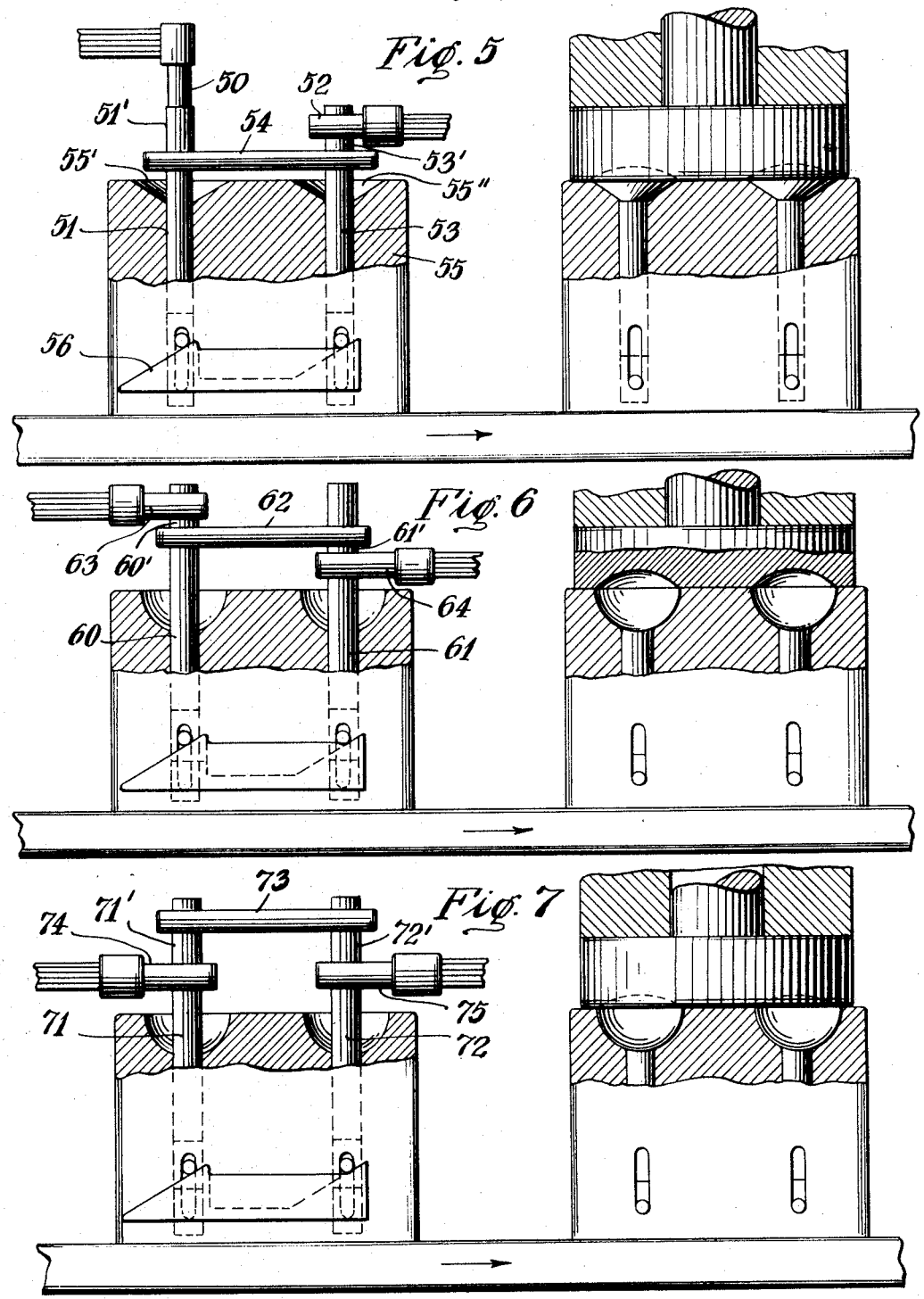

Patented Nov. 27, 1928.

1,693,271

UNITED STATES PATENT OFFICE.

ARTHUR G. DANNELL, OF NEW YORK, N. Y., ASSIGNOR TO ELEKTROMATIK FORGING MACHINE CORPORATION, OF NEW YORK, N. Y., A CORPORATION OF NEW YORK.

ELECTRICAL HEATING AND FORMING MEANS.

Application filed May 11, 1927. Serial No. 190,493.

My present invention relates to means for heating and forging metal articles, particularly electrical heating means for such purposes, and aims to devise means of the general character specified which are simple in construction, which may be readily and economically fabricated and assembled, and which have other advantages and superiorities in construction and in operation which will in part be pointed out in detail hereinafter and will in part be obvious to those skilled in the art to which the present invention relates. The means of the present invention are more particularly adapted for carrying into effect the methods described and claimed in a copending application of mine filed of even date herewith and entitled "Electrical heating and forming methods," whereby one or more of the metal articles to be heated and forged may have any desired portion or portions thereof heated to the desired forging temperature while being held in the forming die or the like, without, however, subjecting said die or the like to any undesirable or harmful electrical or heating effects, after which the article or articles so heated may be forged without subjecting the current and heat-applying means to any undesirable strains or actions resulting from the forging operation, the heating effect being preferably so localized as to avoid unduly heating and thus deteriorating the forming dies, and the forging or other forming operation being preferably so conducted as to avoid unduly straining or otherwise harming the current and heat-applying means.

The present application, like the copending application referred to above, is a continuation in part of my two copending applications, Serial No. 121,101, entitled "Forging machines," filed July 8, 1926, and Serial No. 121,102, entitled "Metal articles," filed July 8, 1926.

In the accompanying specification I shall describe and in the annexed drawing more or less diagrammatically illustrate several illustrative embodiments of the mechanisms of the present invention. It is, however, to be clearly understood that my invention is not limited to the specific embodiments thereof herein shown and described for purposes of illustration merely. It is, furthermore, to be clearly understood that my invention is not limited to its use with the aforesaid illustrative embodiments of the methods described and claimed in my copending application first above referred to.

Referring to the drawing illustrating the aforesaid illustrative embodiments of the mechanisms of the present invention:

Fig. 1 is a diagrammatic view illustrating one embodiment of said invention;

Fig. 2 is a diagrammatic view illustrating another embodiment of said invention;

Fig. 3 is a diagrammatic view illustrating still another embodiment of said invention;

Fig. 4 is a diagrammatic view illustrating a further embodiment of said invention;

Fig. 5 is a diagrammatic view illustrating still another embodiment of said invention;

Fig. 6 is a diagrammatic view illustrating an additional embodiment of said invention; and Fig. 7 is a similar view illustrating still another embodiment of said invention.

Referring now to the aforesaid illustrative embodiments of the present invention, the mechanisms illustrated in the drawing may be briefly described as comprising in their broader aspects, a die having one or more die cavities for containing one or more metal blanks or partially formed articles, preferably corresponding in number to the number of cavities in the die. Obviously, a series of such dies may be employed with a corresponding series of articles in the cavities of each die.

Means are also provided for raising, elevating or otherwise positioning or supporting the metal blanks or partially formed articles within their respective die cavities, or for maintaining or supporting such blanks or other articles in the desired position, or both, for the subsequent heating operation.

I also provide current-distributing means, preferably so constructed and arranged as to be adapted to pass heating current through a portion or portions of one or more metal blanks or partially formed articles without passing such current through or substantially heating the containing die or dies. For this purpose, where a single article is held in the holding die, I provide a plurality of current-distributing members in the form of a pair of electrodes contacting with portions of the metal blank or other article above the cavity or surface of the die, the electrodes in such cases spanning between them the predetermined portion of the metal article which it is desired to heat to a forging temperature.

Where a plurality of articles are simultaneously held in the holding die for simultaneous heating and subsequent forging, I provide as current-distributing means not only a pair of electrodes, one contacting with each of the two articles which are to have portions of the same heated to a forging temperature, but also a current-shunting or current-bridging member of copper or other good electrical conducting material which thus serves to shunt or bridge the current away from the die. In this way, simultaneously, predetermined portions of the metal blanks will be heated to a forging temperature. In any of the above cases, the electrodes as well as the bridging or shunting members are made of copper or other good electrical conducting material.

In any case it will be apparent that the effect of the heating operation will be to localize the heating to those predetermined portions of the metal articles to be heated which are desired to be subsequently forged, without substantially heating the die. This is highly desirable, since any undue heating of the die, as by the passage of heating current therethrough, would serve to blunt its edges and render the same soon inoperative or at any rate greatly deteriorating the quality of the work being done, while at the same time increasing the cost of the heating and forging operations due to wasted heat values and short die life.

Turning now to the aforesaid illustrative embodiments of the methods of the present invention, and more particularly to the drawings illustrating the same, Fig. 1 shows an arrangement in which the die 10 is provided with a cavity 10' in which the metal blank 11, which is to have a portion of the same heated to a forging temperature, rests. The dotted lines show the lowered position of the metal blank 11 corresponding to the non-heating and forming stages. The full lines indicate the position of the article 11 for the heating stage, for which purpose it is brought into contact with the electrodes 12 and 13, the electrode 12 being an upper electrode contacting with the upper face of the article 11, while the electrode 13 is a lateral electrode for contacting with an intermediate portion at the side of the article 11. The portion 11' of the article 11 to be heated will thus be lifted well beyond the cavity 10' of the die 10 and heating current will pass substantially only through such portion, none of it passing through the die 10. A succession of such electrode pairs 12 and 13 may be utilized if the heating is to take place in two or more stages, in which case the pairs of electrodes are locked and the die and its contained blank will move substantially in a plane normal or perpendicular to the plane of the drawing. Beyond the series of pairs of heating electrodes in the plane last described, may be positioned the forming die 14 carried by a header 15 and having the forming cavity 14' which, by being brought into contact with the heated portion 11' of the article 11, which article has been first raised or elevated for the heating operation and subsequently lowered for the forming operation, gives to such heated portion 11' the desired form. The means 16, which may be utilized for elevating and lowering the blank 11 in the cavity 10' of the die 10, may be used for ejecting or otherwise removing such blank from the die. This constitutes a description of one embodiment of the present invention as illustrated in Fig. 1 of the drawing.

Turning now to Fig. 2 of the drawing, there is there shown illustrated an arrangement somewhat similar to that of Fig. 1 in which the electrodes 12' and 13' are both lateral electrodes, rather than one top and one lateral electrode, as shown in Fig. 1 of the drawing. In this arrangement, the die has been designated by reference character 20, the die cavity by reference character 20', the article to be heated by reference character 21 and the predetermined portion of the same to be heated by reference character 21'. The forming die has been designated by reference character 24, the cavity in the same by reference character 24' and the header carrying the die by reference character 25, 26 designating the means for elevating and lowering the blank 20 in its cavity 20' and for subsequently ejecting or otherwise removing the finished article.

In Fig. 3 of the drawing, I have shown an arrangement for simultaneously heating to a forging temperature and for subsequently forging portions of a plurality, such as two, articles. In this case, the die 30 has a plurality of cavities 30' and 30" in which may be disposed the blanks or other articles 31 and 32, the portions 31' and 32' of which are to be heated to a forging temperature. Such articles, having been inserted in their respective die cavities, may now be elevated by the means 33 to the heating position, in which position they are brought into operative contact with the heat-applying means comprising the pair of electrodes 34 and 35 and the bridging or shunting member 36.

By means of the bridging or shunting member the passage of the heating current, and thus the heating effect, is substantially limited to the portions 31' and 32' of the articles 31 and 32, respectively, which it is desired to heat to a forging temperature. For the subsequent forming operation the heated ends 31' and 32' of the articles 31 and 32, respectively, are lowered into forming position, if they have been previously raised for the heating operation, and are brought into contact with the forming cavities 37' and 37" of the die member 37 carried by the header 38. The forming operation being completed, the plurality of formed articles may now be ejected or otherwise removed from the die 30, as by means of the mechanism 33 already referred to.

The arrangement of Fig. 4 of the drawing, corresponds substantially to the arrangement shown in Fig. 3 of the drawing, except that the upper electrodes, here designated by reference characters 44 and 45, are applied laterally rather than vertically, the articles here being designated by reference characters 41 and 42, the portions to be heated by reference characters 41' and 42' respectively, and the cavities in which such articles are located being designated by reference characters 40' and 40'', respectively, in the die 40. The elevating, lowering and ejecting mechanism has been designated by reference character 43, the bridging or shunting member by reference character 46, while the forming die 47 is shown provided with the forming die cavities 47' and 47'' and the header carrying the die by reference character 48. Otherwise the arrangement and mode of operation are substantially the same as for the embodiment illustrated in Fig. 3 of the drawing.

In Fig. 5 I have illustrated an arrangement somewhat analogous to that illustrated diagrammatically in Figs. 3 and 4 of the drawing, and in which the electrode 50 is brought into contact with the upper end of the article 51 by a vertical motion, while the electrode 52 is laterally applied to the upper end of the article 53, the bridging or shunting member being designated by reference character 54. The portions of the articles to be heated have been designated by reference characters 51' and 53', respectively. Here the die has been designated by reference character 55, the die cavities by reference characters 55' and 55'' and the elevating, lowering and ejecting mechanism by reference character 56. The same type of heating mechanism may be employed as is shown in Figs. 3 and 4 of the drawing, and need not be further illustrated here.

In the arrangements shown in Figs. 2, 3, 4 and 5, as in the arrangements shortly to be described in connection with the showings of Figs. 6 and 7, the heating may take place in a succession of stages by the successive intermittent movements of the articles past a series of heat-applying means, such as illustrated in the various figures of the drawings. Turning now to Fig. 6 of the drawing, the articles have been there designated by reference characters 60 and 61 and the bridging or shunting member by reference character 62. As there illustrated, one electrode 63 is applied to the upper portion of the article 60 so as to heat the portion 60' of such article, while the other electrode 64 is applied just above the die to the lower portion of the article 61 to thus heat the portion 61' of the same. Otherwise the arrangement and mode of operation, including the forming operation, are the same as for the embodiments shown in Figs. 3, 4 and 5 of the drawing.

Referring now to Fig. 7 of the drawing, the articles there designated by reference characters 71 and 72 are provided with the bridging member 73 and the electrodes 74 and 75 so as to heat only the lower portions 71' and 72' of the respective articles. In this case, an intermediate portion only of each article is heated to a forging temperature and the action of the forming die is to compress the heated intermediate material into the die cavities of the lower die 76, the upper die or forming member being designated by reference character 77. Otherwise the arrangement of parts and mode of operation is the same as for the embodiments of the invention shown in Figs. 3, 4, 5 and 6 of the drawing.

This concludes the description of the aforesaid illustrative embodiments of the present invention. The manner of assembling such embodiments and of operating the same will be clear to those skilled in the art to which the present invention relates. Similarly, the manner of operating such embodiments and the advantages of the same in use will be likewise apparent to those skilled in this art. Other advantages and superiorities of the present invention will readily occur to those skilled in the art to which the present invention relates.

It is clearly to be understood that throughout the specification and claims, unless a different or contrary meaning is indicated or necessary from the context, the term "elevating" means not merely elevating with respect to the vertical, since the machines of the present invention may be used in a horizontal as well as in a vertical position or in any other position between the vertical and horizontal, but shall be understood to mean as well a movement of the work-piece towards the mouth of, out of, or further out of the die cavity. In the same way, the term "lowering" is for the same reasons to be understood to mean any movement of the work-piece into, or further into the die cavity. Finally, the term "over-heating" or its equivalent, as used in the specification and claims, is intended to refer to such heating of the die as would tend to deprive it of its temper or to blunt and damage its edges and surfaces, or both.

What I claim as my invention is:

1. Means for heating a metal article to a forging temperature, comprising a holding die member provided with a die cavity, means for supporting a metal article within said die cavity so that that portion of said metal article desired to be heated to a forging temperature extends beyond said die cavity, and means for heating said portion of said metal article to a forging temperature without overheating said die.

2. Means for heating a metal article to a forging temperature, comprising a holding die member provided with a die cavity, means for elevating a metal article within said die cavity so that that portion of said metal article desired to be heated to a forging temperature extends beyond said die cavity, and means for heating said portion of said metal article to a forging temperature without overheating said die.

3. Means for heating a metal article to a forging temperature, comprising a holding die member provided with a die cavity, means for supporting a metal article within said die cavity so that that predetermined portion of said metal article desired to be heated to a forging temperature extends beyond said die cavity and means for electrically heating said portion of said metal article to a forging temperature without over-heating said die.

4. Means for heating a metal article to a forging temperature, comprising a holding die member provided with a die cavity, means for elevating a metal article within said die cavity so that that predetermined portion of said metal article desired to be heated to a forging position extends beyond said die cavity, and means for electrically heating said portion of said metal article without over-heating said die.

5. Means for heating a metal article to a forging temperature, comprising a holding die member provided with a die cavity, means for supporting a metal article within said die cavity so that that portion of said metal article desired to be heated to a forging temperature extends beyond said die cavity, and means for electrically heating said portion of said metal article to a forging temperature by passing current therethrough without passing current through said die.

6. Means for heating a metal article to a forging temperature, comprising a holding die member provided with a die cavity, means for elevating a metal article within said die cavity so that that portion of said metal article desired to be heated to a forging temperature extends beyond said die cavity, and means for electrically heating said portion of said metal article to a forging temperature by passing current therethrough without passing current through said die.

7. Means for heating a metal article to a forging temperature, comprising a holding die member provided with a die cavity, means for positioning a metal article within said die cavity so that that portion of said metal article desired to be heated to a forging temperature extends beyond said die cavity, and means for electrically heating said portion of said metal article by passing current therethrough without passing heating current through said die, said electrical heating means comprising a plurality of heating electrodes adapted to contact with said article beyond said die cavity so as to include between said electrodes said portion to be heated to a forging temperature.

8. Means for heating a metal article to a forging temperature, comprising a holding die member provided with a die cavity, means for positioning a metal article within said die cavity so that that portion of said metal article desired to be heated to a forging position extends beyond said die cavity, and means for electrically heating said portion of said metal article without over-heating said die, said electrical heating means comprising a plurality of heating electrodes adapted to contact with said article beyond said die cavity so as to include between said electrodes said portion to be heated to a forging temperature.

9. Means for heating a metal article to a forging temperature, comprising a holding die member provided with a die cavity, means for supporting a metal article within said die cavity so that that portion of said metal article desired to be heated to a forging temperature extends beyond said die cavity, and means for electrically heating said portion of said metal article to a forging temperature by passing current therethrough without passing current through said die, said electrical heating means comprising a plurality of heating electrodes adapted to contact with said article beyond said die cavity so as to include between said electrodes said portion to be heated to a forging temperature.

10. Means for heating a metal article to a forging temperature, comprising a holding die member provided with a die cavity, means for supporting a metal article within said die cavity so that that portion of said metal article desired to be heated to a forging temperature extends beyond said die cavity, and means for electrically heating said portion of said metal article to a forging temperature without over-heating said die, said electrical heating means comprising a plurality of heating electrodes adapted to contact with said article beyond said die cavity so as to include between said electrodes said portion to be heated.

11. Means for heating a metal article to a forging temperature, comprising a holding die member provided with a die cavity, means for supporting a metal article within said die cavity so that that portion of said metal article desired to be heated to a forging temperature extends beyond said die cavity, and means for electrically heating said portion of said metal article to a forging temperature by passing current therethrough without passing current through said die, said electrical heating means comprising a heating electrode and a shunting electrode adapted to contact with said article beyond said die cavity so as to include between said electrodes said portion to be heated to a forging temperature.

12. Means for heating a metal article to a forging temperature, comprising a holding die member provided with a die cavity, means for supporting a metal article within said die cavity so that that portion of said metal article desired to be heated to a forging temperature extends beyond said die cavity, and means for electrically heating said portion of said metal article to a forging temperature without over-heating said die, said electrical heating means comprising a heating electrode and a shunting electrode adapted to contact with said article beyond said die cavity so as to include between said electrodes said portion to be heated to a forging temperature.

13. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously heating said portions of said metal articles to a forging temperature without over-heating said die.

14. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously heating said portions of said metal articles to a forging temperature without over-heating said die.

15. Means for simultaneously heating a plurality of metal articles to a forging temperature, comprising a holding die provided with a plurality of die cavities for receiving said metal articles, means associated with said die and with said die cavities for supporting a plurality of metal articles within said die cavities so that those portions of said metal articles desired to be heated to a forging temperature extend beyond the respective die cavities, and means for simultaneously electrically heating said portions of said metal articles to a forging temperature without over-heating said die.

16. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously electrically heating said portions of said metal articles to a forging temperature without over-heating said die.

17. Means for simultaneously heating a plurality of metal articles to a forging temperature, comprising a holding die provided with a plurality of die cavities for receiving said metal articles, means associated with said die and with said die cavities for supporting a plurality of metal articles within said die cavities so that those portions of said metal articles desired to be heated to a forging temperature extend beyond the respective die cavities, and means for simultaneously electrically heating said portions of said metal articles to a forging temperature by passing current through said portions of said metal articles without passing current through said die.

18. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously electrically heating said portions of said metal articles to a forging temperature by passing heating current through said portions of said metal articles without passing heating current through said die.

19. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously electrically heating said portions of said metal articles to a forging temperature by passing current through said portions of said metal articles without passing current through said die, said electrical heating means comprising a plurality of heating electrodes adapted to contact with said articles beyond the respective die cavities and an electrical shunting member likewise adapted to contact with said metal articles beyond the respective die cavities, said electrodes and said shunting member including between them said portions of said metal articles to be heated to a forging temperature.

20. Means for simultaneously heating a plurality of metal articles to a forging temperature, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously electrically heating said portions of said metal articles to a forging temperature without over-heating said die, said electrical heating means comprising a plurality of heating electrodes adapted to contact with said articles beyond the respective die cavities and an electrical shunting member likewise adapted to contact with said metal articles beyond the respective die cavities, said electrodes and said shunting member including between them said portions of said metal articles to be heated to a forging temperature.

21. Means for simultaneously heating a plurality of metal articles to a forging temperature, comprising a holding die provided with a plurality of die cavities for receiving said metal articles, means associated with said die and with said die cavities for supporting a plurality of metal articles within said die cavities so that those portions of said metal articles desired to be heated to a forging temperature extend beyond the respective die cavities, and means for simultaneously electrically heating said predetermined portions of said metal articles to a forging temperature by passing current through said portions of said metal articles without passing current through said die, said electrical heating means comprising a plurality of heating electrodes adapted to contact with said articles beyond the respective die cavities and an electrical shunting member likewise adapted to contact with said metal articles beyond the respective die cavities, said electrodes and said shunting member including between them said portions of said metal articles to be heated to a forging temperature.

22. Means for simultaneously heating a plurality of metal articles to a forging temperature, comprising a holding die provided with a plurality of die cavities for receiving said metal articles, means associated with said die and with said die cavities for supporting a plurality of metal articles within said die cavities so that those portions of said metal articles desired to be heated to a forging temperature extend beyond the respective die cavities, and means for simultaneously electrically heating said portions of said metal articles without over-heating said die, said electrical heating means comprising a plurality of heating electrodes adapted to contact with said articles beyond the respective die cavities and an electrical shunting member likewise adapted to contact with said metal articles beyond the respective die cavities, said electrodes and said shunting member including between them said portions of said metal articles to be heated to a forging temperature.

23. Means for heating a metal article to a forging temperature and thereafter forging the same, comprising a holding die member provided with a die cavity, means for positioning a metal article within said die cavity so that that portion of said metal article desired to be heated to a forging temperature extends beyond said die cavity, and means for heating said portion of said metal article to a forging temperature without over-heating said die, in combination with means for positioning said article in said die cavity to the rear of its heating position in said die cavity to bring the same into forging position and for forging the heated portion of said metal article in such rear position.

24. Means for heating a metal article to a forging temperature and thereafter forging the same, comprising a holding die member provided with a die cavity, means for positioning a metal article within said die cavity so that that portion of said metal article desired to be heated to a forging temperature extends beyond said die cavity, and means for electrically heating said portion of said metal article to a forging temperature without over-heating said die, in combination with means for positioning said article in said die cavity to the rear of its heating position in said die cavity to bring the same into forging position, and for forging the heated portion of said metal article in such rear position.

25. Means for heating a metal article to a forging temperature and thereafter forging the same, comprising a holding die member provided with a die cavity, means for positioning a metal article within said die cavity so that that portion of said metal article desired to be heated to a forging temperature extends beyond said die cavity, and means for electrically heating said portion of said metal article to a forging temperature by passing current therethrough without passing current through said die, in combination with means for positioning said article in said die cavity to the rear of its heating position in said die cavity to bring the same into forging position and for forging the heated portion of said metal article in such rear position.

26. Means for heating a metal article to a forging temperature and thereafter forging the same, comprising a holding die member provided with a die cavity, means for positioning a metal article within said die cavity so that that portion of said metal article desired to be heated to a forging temperature extends beyond said die cavity, and means for electrically heating said portion of said metal article to a forging temperature by passing current therethrough without passing current through said die, said electrical heating means comprising a plurality of heating electrodes adapted to contact with said article beyond said die cavity so as to include between said electrodes said portion to be heated to a forging temperature in combination with means for positioning said article in said die cavity to the rear of its heating position in said die cavity to bring the same into forging position and for forging the heated portion of said metal article in such rear position.

27. Means for heating a metal article to a forging temperature and thereafter forging the same, comprising a holding die member provided with a die cavity, means for positioning a metal article within said die cavity so that that portion of said metal article desired to be heated to a forging temperature extends beyond said die cavity, and means for electrically heating said portion of said metal article to a forging temperature by passing current therethrough without passing current through said die, said electrical heating means comprising a heating electrode and a shunting electrode adapted to contact with said article beyond said die cavity so as to include between said electrodes said portion to be heated to a forging temperature, in combination with means for lowering said article in said die cavity to the rear of its heating position in said die cavity to bring the same into forging position and for forging the heated portion of said metal article in such rear position.

28. Means for simultaneously heating a plurality of metal articles to a forging temperature and thereafter forging the same, comprising a holding die provided with a plurality of die cavities for receiving said metal articles, means associated with said die and with said die cavities for positioning a plurality of metal articles within said die cavities so that those portions of said metal articles desired to be heated to a forging temperature extend beyond the respective die cavities, and means for simultaneously heating said portions of said metal articles to a forging temperature without overheating said die, in combination with means for retreating said metal articles in their respective die cavities to the rear of their respective heating positions in their respective die cavities into position to be forged for forging the heated portions of said metal articles in such rear positions.

29. Means for simultaneously heating a plurality of metal articles to a forging temperature and thereafter forging the same, comprising a holding die provided with a plurality of die cavities for receiving said metal articles, means associated with said die and with said die cavities for positioning a plurality of metal articles within said die cavities so that predetermined portions of said metal articles desired to be heated to a forging temperature extend beyond the respective die cavities, and means for simultaneously electrically heating said portions of said metal articles to a forging temperature by passing current through said portions of said metal articles without passing current through said die, in combination with means for retreating said metal articles in their respective die cavities to the rear of their respective heating positions in their respective die cavities into position to be forged and for forging the heated portions of said metal articles in such rear positions.

30. Means for simultaneously heating a plurality of metal articles to a forging temperature and thereafter forging the same, comprising a holding die provided with a plurality of die cavities for receiving said metal articles, means associated with said die and with said die cavities for positioning a plurality of metal articles within said cavities so that those portions of said metal articles desired to be heated to a forging temperature extend beyond the respective die cavities, and means for simultaneously electrically heating said predetermined portions of said metal articles without over-heating said die, said electrical heating means comprising a plurality of heating electrodes adapted to contact with said articles beyond the respective die cavities and an electrical shunting member likewise adapted to contact with said metal articles beyond the respective die cavities, said electrodes and said shunting member including between them said portions of said metal articles to be heated to a forging temperature, in combination with means for retreating said metal articles in their respective die cavities to the rear of their respective heating positions in their respective die cavities into position to be forged and for forging the heated portions of said metal articles in such rear positions.

In testimony whereof I have signed my name to this specification this 10th day of May, 1927.

ARTHUR G. DANNELL.